US010402262B1

(12) United States Patent
Wu et al.

(10) Patent No.: US 10,402,262 B1
(45) Date of Patent: Sep. 3, 2019

(54) FENCING FOR ZIPHEADER CORRUPTION FOR INLINE COMPRESSION FEATURE SYSTEM AND METHOD

(71) Applicant: EMC IP Holding Company, LLC, Hopkinton, MA (US)

(72) Inventors: Marshall Wu, Shanghai (CN); Maher Kachmar, Marlborough, MA (US); Ivan Bassov, Brookline, MA (US); Yining Si, Sherborn, MA (US); Philippe Armangau, Acton, MA (US); Yaming Kuang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 33 days.

(21) Appl. No.: 15/663,198

(22) Filed: Jul. 28, 2017

(51) Int. Cl.
*G06F 11/07* (2006.01)
*G06F 16/11* (2019.01)

(52) U.S. Cl.
CPC ........ *G06F 11/0793* (2013.01); *G06F 11/073* (2013.01); *G06F 11/079* (2013.01); *G06F 11/0751* (2013.01); *G06F 11/0772* (2013.01); *G06F 16/11* (2019.01)

(58) Field of Classification Search
CPC ............... G06F 11/1004; G06F 3/0619; G06F 11/0793; G06F 11/079; G06F 11/0772; G06F 11/0751; G06F 11/073; H03M 7/30
See application file for complete search history.

(56) References Cited

U.S. PATENT DOCUMENTS

2017/0286213 A1* 10/2017 Li ......................... G06F 3/0619
2018/0217897 A1* 8/2018 Nazari ............... G06F 11/1004

* cited by examiner

*Primary Examiner* — Shelly A Chase
(74) *Attorney, Agent, or Firm* — Brian J. Colandreo; Mark H. Whittenberger; Holland & Knight LLP

(57) ABSTRACT

A method, computer program product, and computer system for receiving, at a computing device, an I/O request directed to a compressed data portion of a file system. A field associated with the compressed data portion may be determined to be invalid. An error may be generated in response to determining that the field associated with the compressed data portion is invalid. The file system may be maintained in an online status while the compressed data portion is invalid.

17 Claims, 8 Drawing Sheets

10

600 receiving an I/O request directed to a compressed data portion of a file system 602 determining that a field associated with the compressed data portion is invalid 604 generating an error in response to determining that the field associated with the compressed data portion is invalid 606 maintaining the file system in an online status while the compressed data portion is invalid 608 returning the error for the I/O request, when the I/O request is a read request 610 allocating a new block for the compressed data portion, when the I/O request is a write request 612 filling the new block with zeros 614 marking the new block as invalid.

616 writing new data for the write request in the new block

500

FENCING FOR ZIPHEADER CORRUPTION FOR INLINE COMPRESSION FEATURE SYSTEM AND METHOD

BACKGROUND

Generally, with the increasing amounts of information being stored, it may be beneficial to efficiently store and manage that information. While there may be numerous techniques for storing and managing information, each technique may have tradeoffs between reliability and efficiency.

BRIEF SUMMARY OF DISCLOSURE

In one example implementation, a method, performed by one or more computing devices, may include but is not limited to receiving, at a computing device, an I/O request directed to a compressed data portion of a file system. A field associated with the compressed data portion may be determined to be invalid. An error may be generated in response to determining that the field associated with the compressed data portion is invalid. The file system may be maintained in an online status while the compressed data portion is invalid.

One or more of the following example features may be included. The field associated with the compressed data portion may include one of a header version in a ZipHeader and a checksum value for the ZipHeader. The error for the I/O request may be returned, when the I/O request is a read request, based upon, at least in part, determining that the field associated with the compressed data portion is invalid. A new block for the compressed data portion may be allocated, when the I/O request is a write request, based upon, at least in part, determining that the field associated with the compressed data portion is invalid. The new block may be filled with zeros. The new block may be marked as invalid. New data for the write request may be written in the new block.

In another example implementation, a computing system may include one or more processors and one or more memories configured to perform operations that may include but are not limited to receiving an I/O request directed to a compressed data portion of a file system. A field associated with the compressed data portion may be determined to be invalid. An error may be generated in response to determining that the field associated with the compressed data portion is invalid. The file system may be maintained in an online status while the compressed data portion is invalid.

One or more of the following example features may be included. The field associated with the compressed data portion may include one of a header version in a ZipHeader and a checksum value for the ZipHeader. The error for the I/O request may be returned, when the I/O request is a read request, based upon, at least in part, determining that the field associated with the compressed data portion is invalid. A new block for the compressed data portion may be allocated, when the I/O request is a write request, based upon, at least in part, determining that the field associated with the compressed data portion is invalid. The new block may be filled with zeros. The new block may be marked as invalid. New data for the write request may be written in the new block.

In another example implementation, a computer program product may reside on a computer readable storage medium having a plurality of instructions stored thereon which, when executed across one or more processors, may cause at least a portion of the one or more processors to perform operations that may include but are not limited to receiving an I/O request directed to a compressed data portion of a file system. A field associated with the compressed data portion may be determined to be invalid. An error may be generated in response to determining that the field associated with the compressed data portion is invalid. The file system may be maintained in an online status while the compressed data portion is invalid.

One or more of the following example features may be included. The field associated with the compressed data portion may include one of a header version in a ZipHeader and a checksum value for the ZipHeader. The error for the I/O request may be returned, when the I/O request is a read request, based upon, at least in part, determining that the field associated with the compressed data portion is invalid. A new block for the compressed data portion may be allocated, when the I/O request is a write request, based upon, at least in part, determining that the field associated with the compressed data portion is invalid. The new block may be filled with zeros. The new block may be marked as invalid. New data for the write request may be written in the new block.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
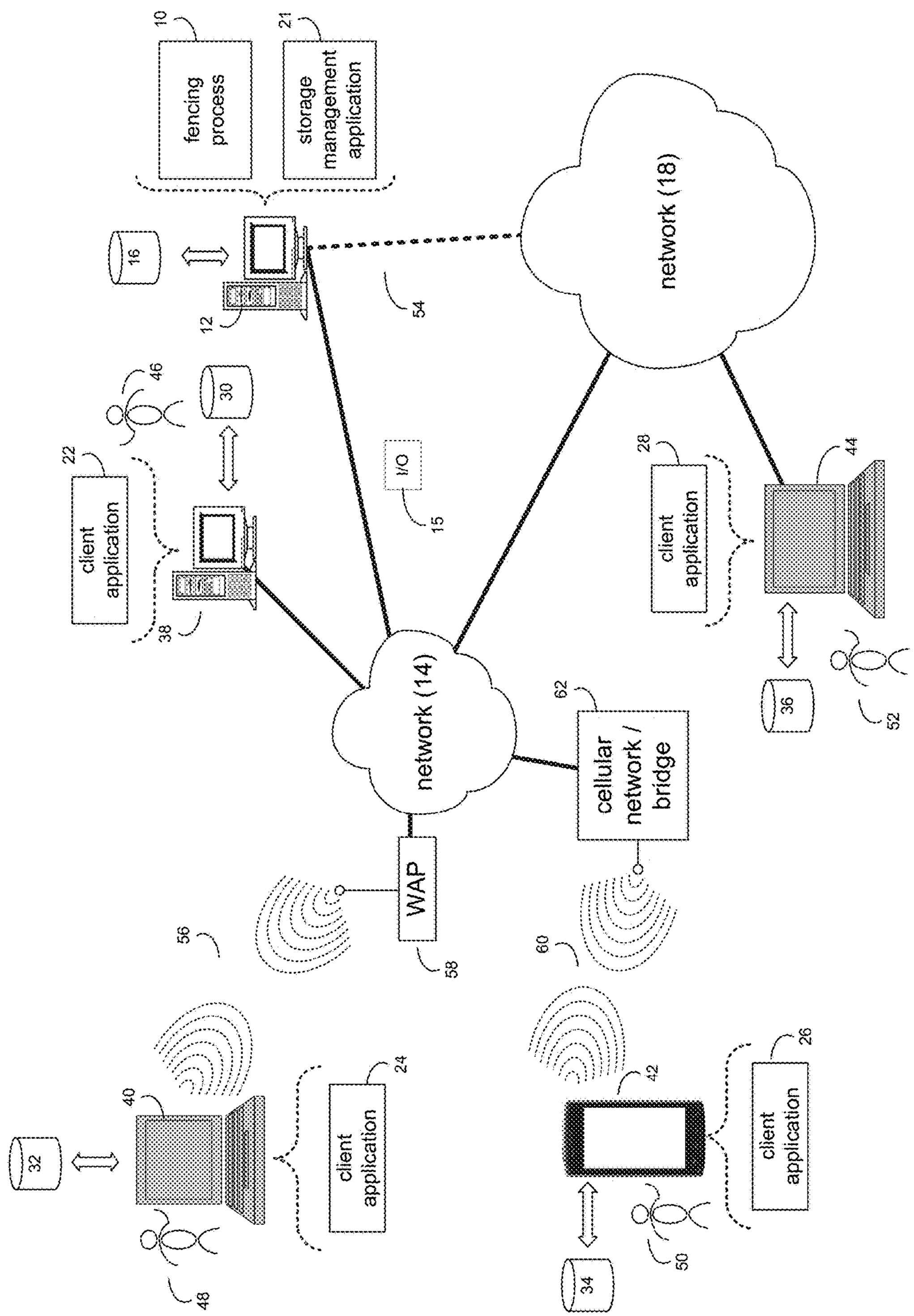
FIG. 1 is an example diagrammatic view of a fencing process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a standalone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function (s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown fencing process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer (s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, an fencing process, such as fencing process 10 of FIG. 1, may select, by a computing device, a first disk extent for each RAID extent in an extent pool. Remaining disk extents for each RAID extent in the extent pool may be selected.

In some implementations, the instruction sets and subroutines of fencing process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, fencing process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network. An example cloud computing environment that may be used with the disclosure may include but is not limited to, e.g., Elastic Cloud Storage (ECS™) from Dell EMC™ of Hopkinton, Mass. In some implementations, other cloud computing environments may be used without departing from the scope of the disclosure.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, fencing process 10 and/or storage management application 21 may be accessed via one or more of client applications 22, 24, 26, 28. In some implementations, fencing process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within fencing process 10, a component of fencing process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of fencing process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of fencing process 10 (and vice versa). Accordingly, in some implementations, fencing process 10 may be a purely server-side application, a purely client-side application, or a hybrid server-side/client-side application that is cooperatively executed by one or more of client applications 22, 24, 26, 28 and/or fencing process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, fencing process 10, and storage management application 21, taken singly or in any combination, may effectuate some or all of the same functionality, any description of effectuating such functionality via one or more of client applications 22, 24, 26, 28, fencing process 10, storage management application 21, or combination thereof, and any described interaction(s) between one or more of client applications 22, 24, 26, 28, fencing process 10, storage management application 21, or combination thereof to effectuate such functionality, should be taken as an example only and not to limit the scope of the disclosure.

In some implementations, one or more of users 46, 48, 50, 52 may access computer 12 and fencing process 10 (e.g., using one or more of client electronic devices 38, 40, 42, 44) directly through network 14 or through secondary network 18. Further, computer 12 may be connected to network 14 through secondary network 18, as illustrated with phantom link line 54. Fencing process 10 may include one or more user interfaces, such as browsers and textual or graphical user interfaces, through which users 46, 48, 50, 52 may access fencing process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
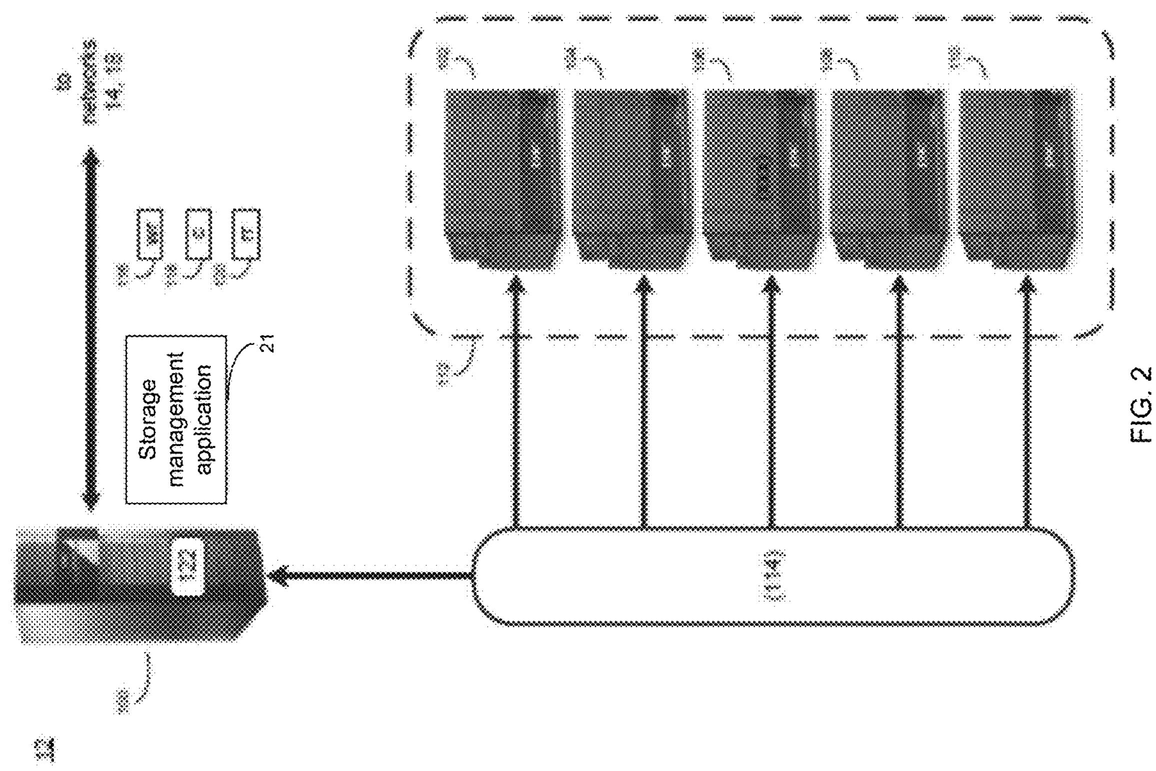
FIG. 2 is an example diagrammatic view of a computer of FIG. 1 according to one or more example implementations of the disclosure.
Figure 3:
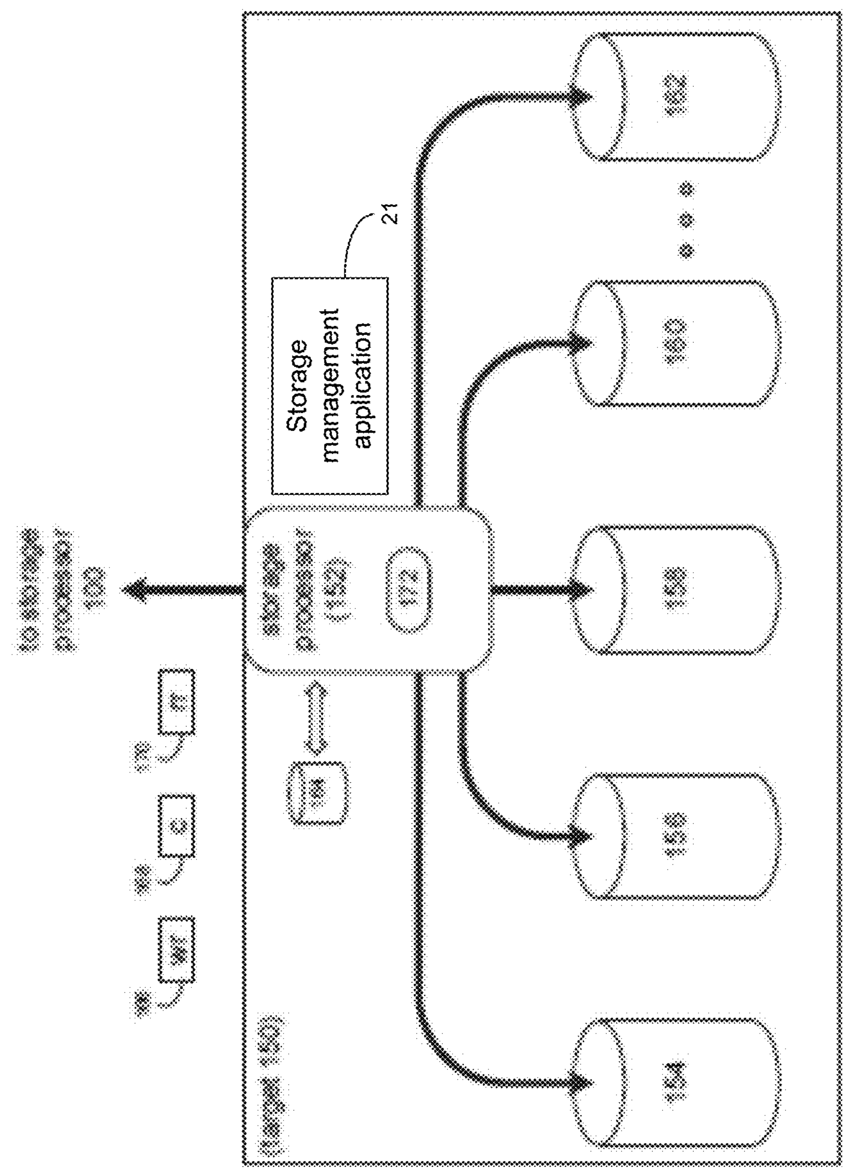
FIG. 3 is an example diagrammatic view of a storage target of FIG. 2 according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management application 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX™ system offered by Dell EMC™ of Hopkinton, Mass.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management application 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management application 21). Additionally/alternatively (e.g., when storage processor 100 is configured as an application server or otherwise), content 118 to be written to computer 12 may be internally generated by storage processor 100 (e.g., via storage management application 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or fencing process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management application 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. An example of target 150 may include but is not limited to a VNX™ system offered by Dell EMC™ of Hopkinton, Mass. Examples of storage devices 154, 156, 158, 160, 162 may include one or more electro-mechanical hard disk drives, one or more solid-state/flash devices, and/or any of the above-noted storage devices.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management application 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management application 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management application 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management application 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management application 21) and initially stored (e.g., via storage management application 21) within front end cache memory system 172.

Figure 4:
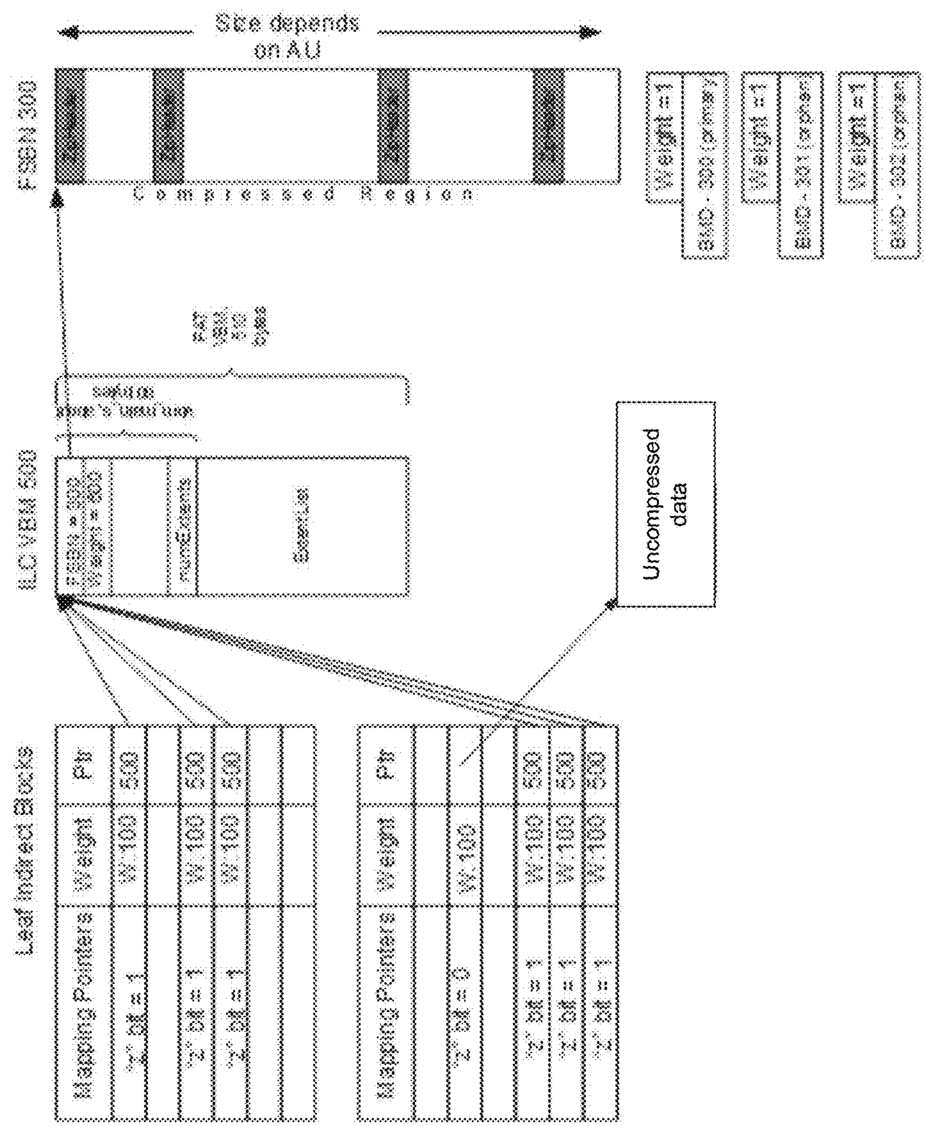
FIG. 4 is an example diagrammatic view of a file system layout according to one or more example implementations of the disclosure.

Referring also to the example implementation of FIG. 4, there is shown a diagrammatic view of an example file system layout 400. In some implementations, storage management application 21 may implement an Inline Compression (ILC) feature. ILC may provide the ability to reduce the amount of storage needed for user data on a storage device by compressing portions of the data at the time the data is first written. To support this feature, at least in part, file system layout 400 may include a ILC Virtual Block Metadata (VBM) and compressed data segment to hold the compressed data. Each compressed data portion may be associated with an extent stored in the Extent List inside the ILC VBM. To support recoverability of the ILC VBM, e.g., in the case when a cyclic redundancy check (CRC) or other error detecting technique of the ILC VBMs are all bad), there may be a ZipHeader in the beginning of every compressed data portion.

In some implementations, the CRC field may be located in the ZipHeader, and when the CRC goes bad, the ZipHeader cannot be trusted. When a read I/O is targeted to this compressed data region, the ZipHeader may be read out and CRC may be verified whether it is good (e.g., valid) or bad (e.g., invalid). If the CRC is bad, generally, the entire file system may be marked as offline for recovery, which may cause data unavailability. There may be other fields in the ZipHeader, such as header version. Generally, if this field is bad, the entire file system may also be marked offline as needing recovery, which may also cause data unavailability. The entire file system may be required to be marked as offline, at least because there is currently no mechanism to just fence a small portion of the file system metadata (e.g., file system metadata using ZipHeaders), thus the file system may have to be brought offline to trigger recovery and fix the corruption to avoid metadata from being corrupted even worse.

Figure 5:
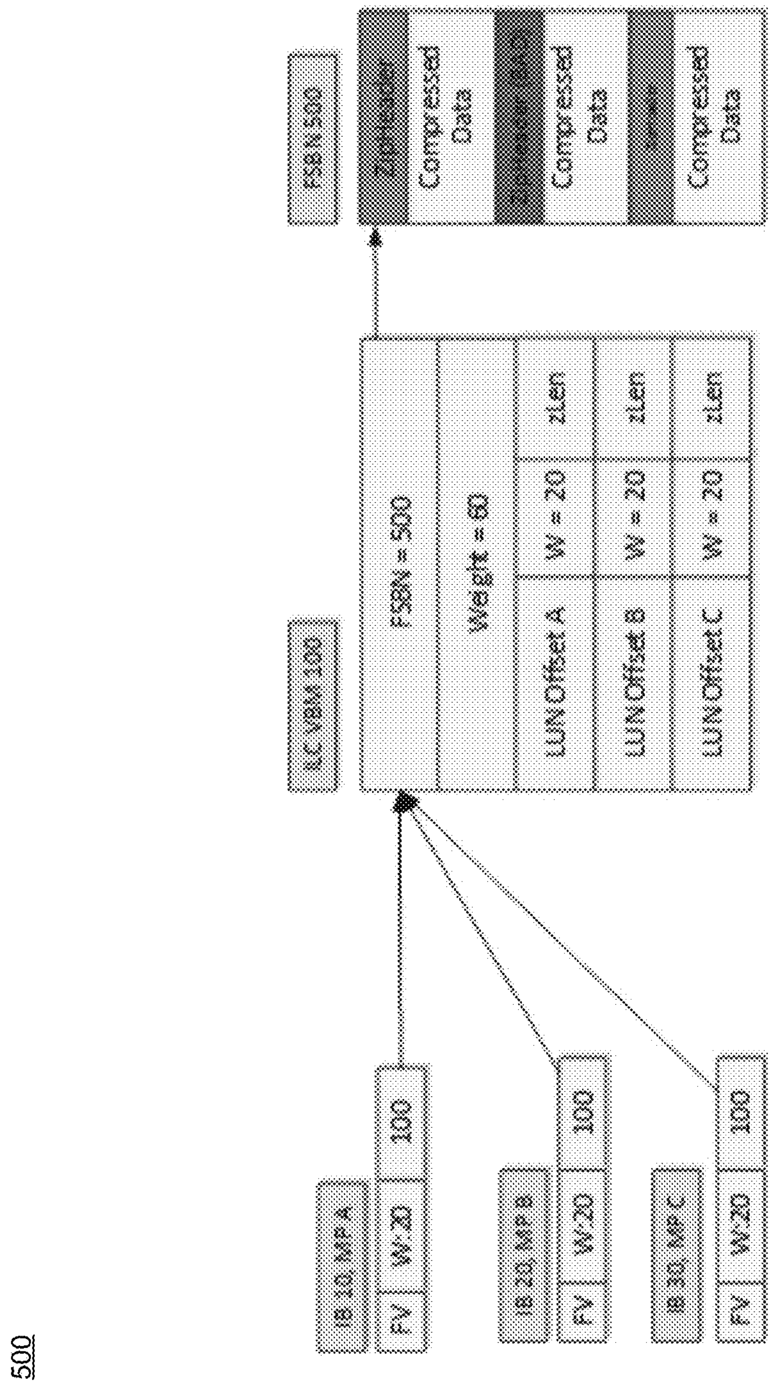
FIG. 5 is an example diagrammatic view of a ZipHeader according to one or more example implementations of the disclosure.

Referring also to the example implementation of FIG. 5, there is shown a diagrammatic view of an example "bad" ZipHeader in a file system layout 500. Specifically, FIG. 5 shows an example of a bad ZipHeader for leaf IB 20. When a read is targeted to leaf IB-B, which the 2nd extent in the ILC VBM extent list may be read. After, the 2nd ZipHeader in FSBN 500 may be read out and an integrity check may be performed to verify whether it may be trusted. Since in this example this is a bad ZipHeader (e.g., either bad CRC or wrong header version), the entire file system may be marked offline as needing recovery.

As will be discussed below, fencing process 10 may at least help, e.g., improvement data storage technology, necessarily rooted in computer technology in order to overcome an example and non-limiting problem specifically arising in the realm of file systems associated with, e.g., data unavailability of an entire file system when a bad ZipHeader is detected.

Figure 6:
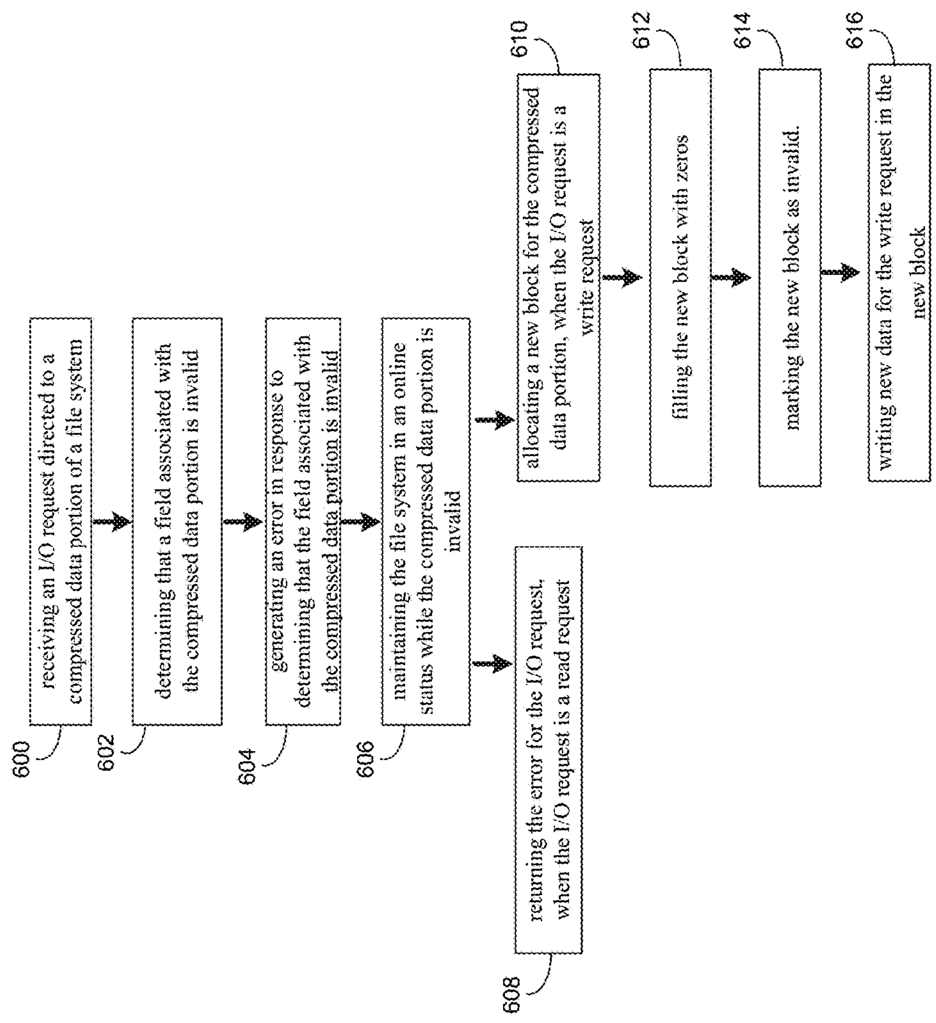
FIG. 6 is an example flowchart of a fencing process according to one or more example implementations of the disclosure.
Figure 7:
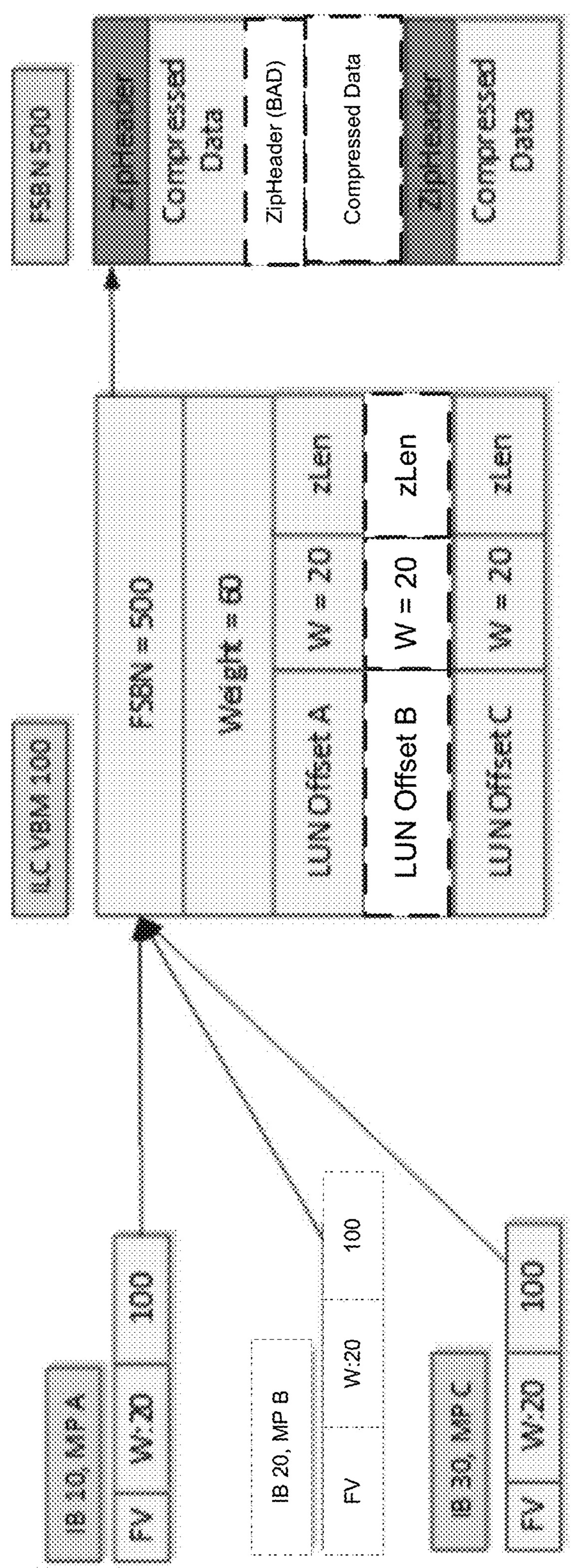
FIG. 7 is an example diagrammatic view of a bad ZipHeader detection during a read request according to one or more example implementations of the disclosure.
Figure 8:
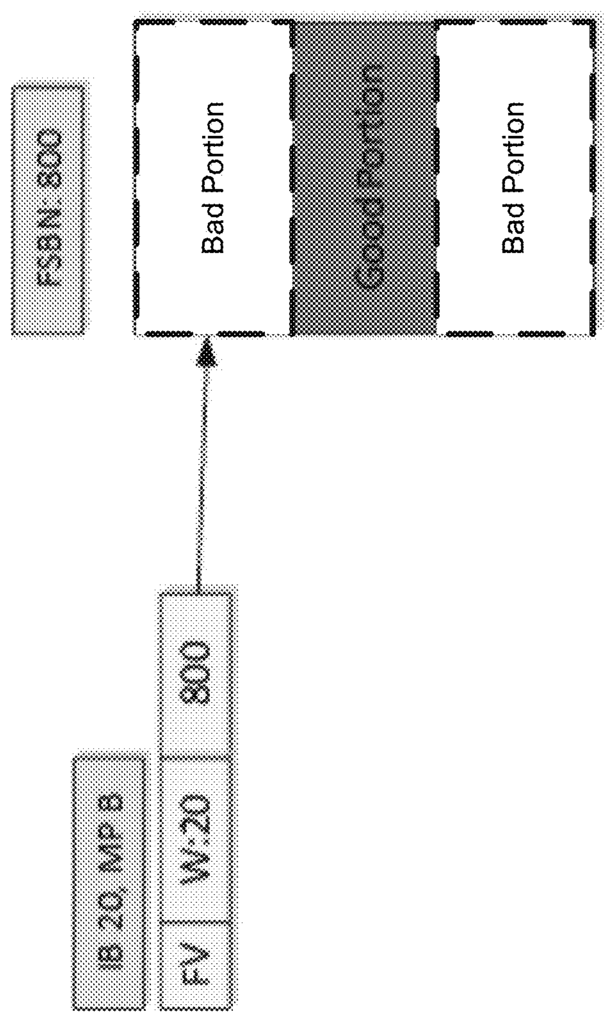
FIG. 8 is an example diagrammatic view of a partial write with the existence of a bad ZipHeader according to one or more example implementations of the disclosure.

The Fencing Process:

As discussed above and referring also at least to the example implementations of FIGS. 6-8, fencing process 10 may receive 600, at a computing device, an I/O request directed to a compressed data portion of a file system. Fencing process 10 may determine 602 that a field associated with the compressed data portion is invalid. Fencing process 10 may generate 604 an error in response to determining that the field associated with the compressed data portion is invalid. Fencing process 10 may maintain 606 the file system in an online status while the compressed data portion is invalid.

In some implementations, fencing process 10 may receive 600, at a computing device, an I/O request directed to a compressed data portion of a file system. For instance, assume for example purposes only that a user (e.g., user 46) has sent an I/O (e.g., I/O request 15) directed to the compressed data portion shown in the example file system layout in FIGS. 4 and 5. In the example, I/O request 15 may be received 600 by fencing process 10.

In some implementations, fencing process 10 may determine 602 that a field associated with the compressed data portion is invalid. In some implementations, the field associated with the compressed data portion may include one of a header version in a ZipHeader and a checksum value for the ZipHeader. For instance, assume for example purposes only that I/O 15 is targeted to leaf IB-B, resulting in the 2nd extent in the ILC VBM extent list being read. Further assume that the 2nd ZipHeader in FSBN 500 is read out and an integrity check is performed (e.g., either on the header version in the ZipHeader, the checksum value for the ZipHeader, any other field in the ZipHeader, or combination thereof) to determine 602 whether the ZipHeader may be trusted (e.g., whether it is valid). When I/O 15 is targeted to this compressed data region, the ZipHeader may be read out and CRC (or other error detecting technique) may be compared to determine 602 whether it is good (e.g., valid) or bad (e.g., invalid). For instance, the ZipHeader content being read to memory may be used to calculate the CRC and this CRC may be used to compare with the one stored in the ZipHeader. Additionally, the ZipHeader version may also be stored in memory as a global value (e.g., per engineering release) and if this value is not consistent with the one stored in the ZipHeader, it may also be treated as bad.

In some implementations, fencing process 10 may generate 604 an error in response to determining that the field associated with the compressed data portion is invalid. For instance, assume for example purposes only that fencing process 10 has determined 602 that at least one field (e.g., header version field in the ZipHeader and/or the checksum value field for the ZipHeader) associated with the compressed data portion is invalid. In the example, based upon an invalid field in the ZipHeader, fencing process 10 may generate 604 an error.

In some implementations, the error for I/O request 15 may be returned 608, when the I/O request is a read request, based upon, at least in part, determining 602 that the field associated with the compressed data portion is invalid. For instance, assume for example purposes only that I/O request 15 is a read request directed towards the invalid compressed data portion.

In some implementations, fencing process 10 may maintain 606 the file system in an online status while the compressed data portion is invalid. For instance, and referring to the example implementation of FIG. 7, an example of fencing of the data portion that has a corrupted ZipHeader (shown in dashed lines) can be seen. In the example, when there is read I/O that triggers a read to the corresponding ZipHeader, when any field in the ZipHeader is determined 602 as not trusted or gone bad, instead of marking the entire file system as offline (which may be the traditional approach), fencing process 10 may maintain 606 the file system in an online status and return 608 the error (e.g., EXT-LOST error) to the host side. In some implementations, any subsequent read request to the same "bad" portion of data may still be retuned 608 with the EXT-LOST error code, but any read/write requests to the good portions of the file system (e.g., a portion of the file system where each field in the ZipHeader is determined to be valid) may still be served successfully. This may effectively reduce the time of data unavailability in the case of ZipHeader corruptions. In FIG. 7, there is shown an example of a bad ZipHeader detected in LUN offset B during a read from Indirect Block 20, Mapping Pointer B from some inode. As noted above, EXT-LOST error may be returned 608 in this case, and read requests to other LUN offsets (such as A and C) in this ILC-VBM may still be good since the ZipHeader associated with offset A and C are still good.

In some implementations, a new block for the compressed data portion may be allocated 610, when the I/O request is a write request, based upon, at least in part, determining 602 that the field associated with the compressed data portion is invalid. For instance, assume for example purposes only that I/O request 15 is a write request (e.g., a partial write) directed towards the invalid compressed data portion. In the example case of partial write, since fencing process 10 may need to first read out the whole block where the write request is directed, fencing process 10 may determine 602 (as noted above) that this is a corrupted ZipHeader. For instance, and referring to the example implementation of FIG. 8, an example of fencing (with a partial write to compress the region) of the data portion that has a corrupted bad ZipHeader portion (shown in dashed lines) and a valid portion can be seen. As a result, fencing process 10 may allocated 610 a new block for the compressed data portion. Normally to serve a partial write without any corruption in the ZipHeader, fencing process 10 may first read out (e.g., decompress) the original block, copy the newly written portion to the block, then write back (e.g., compress again) to storage device (e.g., disk).

In some implementations, fencing process 10 may fill 612 the new block with zeros, the new block may be marked 614 as invalid, and, new data for the write request may be written 616 in the new block. For example, and referring still to FIG. 8, if a partial write to the compressed region has a bad ZipHeader, fencing process 10 may allocate 610 a new block (e.g., an 8K block), fill 612 the 8K block with zeros, mark 614 the entire 8K block as bad, and copy/write 616 the newly written portion and write 616 it to disk. In the example, the newly written portion may be treated as good data. In the example, any read request to the newly written portion may be returned with good data, and any read requests to the bad portion may be returned with the above-noted error.

For example, fencing process 10 may write 616 the new data to the new block, which may be treated as valid data. In the example, when user 48 later issues a read request to the new partially written data portion in the new block, the read request may be returned with the valid data and no error may be generated. However, when user 48 issues a read request to the invalid portion, the error code EXT-LOST may still be generated 604 and returned 608 to the host side. Thus, instead of marking the entire file system as offline when encountering an invalid ZipHeader (which may be the traditional approach), fencing process 10 may maintain 606 the file system in an online status to service the write request with no generated error. In some implementations, any subsequent read request to the same "bad" portion of data may still be retuned with the EXT-LOST error code, but any read/write requests to the good portions (or new portions) of the file system (e.g., a portion of the file system where each field in the ZipHeader is determined to be valid) may still be served successfully. This may effectively reduce the time of data unavailability in the case of ZipHeader corruptions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:

receiving, at a computing device, an I/O request directed to a compressed data portion of a file system;

determining that a field associated with the compressed data portion is invalid, wherein the field associated with the compressed data portion includes one of a header version in a ZipHeader and a checksum value for the ZipHeader, wherein the ZipHeader is stored in memory as a global value;

generating an error in response to determining that the field associated with the compressed data portion is invalid;

maintaining the file system in an online status while the compressed data portion is invalid; and allocating a new block for the compressed data portion when the I/O request is a write request.

2. The computer-implemented method of claim 1 further comprising returning the error for the I/O request, when the I/O request is a read request, based upon, at least in part, determining that the field associated with the compressed data portion is invalid.

3. The computer-implemented method of claim 1 wherein allocating the new block for the compressed data portion, when the I/O request is the write request, is based upon, at least in part, determining that the field associated with the compressed data portion is invalid.

4. The computer-implemented method of claim 3 further comprising filling the new block with zeros.

5. The computer-implemented method of claim 4 further comprising marking the new block as invalid.

6. The computer-implemented method of claim 5 further comprising writing new data for the write request in the new block.

7. A computer program product residing on a non-transitory computer readable storage medium having a plurality of instructions stored thereon which, when executed across one or more processors, causes at least a portion of the one or more processors to perform operations comprising:

receiving an I/O request directed to a compressed data portion of a file system;

determining that a field associated with the compressed data portion is invalid, wherein the field associated with the compressed data portion includes one of a header version in a ZipHeader and a checksum value for the ZipHeader, wherein the ZipHeader is stored in memory as a global value;

generating an error in response to determining that the field associated with the compressed data portion is invalid;

maintaining the file system in an online status while the compressed data portion is invalid; and allocating a new block for the compressed data portion when the I/O request is a write request.

8. The computer program product of claim 7 wherein the operations further comprise returning the error for the I/O request, when the I/O request is a read request, based upon, at least in part, determining that the field associated with the compressed data portion is invalid.

9. The computer program product of claim 7 wherein allocating the new block for the compressed data portion, when the I/O request is the write request, is based upon, at least in part, determining that the field associated with the compressed data portion is invalid.

10. The computer program product of claim 9 wherein the operations further comprise filling the new block with zeros.

11. The computer program product of claim 10 wherein the operations further comprise marking the new block as invalid.

12. The computer program product of claim 11 wherein the operations further comprise writing new data for the write request in the new block.

13. A computing system including one or more processors and one or more memories configured to perform operations comprising:

receiving an I/O request directed to a compressed data portion of a file system;

determining that a field associated with the compressed data portion is invalid, wherein the field associated with the compressed data portion includes one of a header version in a ZipHeader and a checksum value for the ZipHeader, wherein the ZipHeader is stored in memory as a global value;

generating an error in response to determining that the field associated with the compressed data portion is invalid;

maintaining the file system in an online status while the compressed data portion is invalid; and allocating a new block for the compressed data portion when the I/O request is a write request.

14. The computing system of claim 13 wherein the operations further comprise returning the error for the I/O request, when the I/O request is a read request, based upon, at least in part, determining that the field associated with the compressed data portion is invalid.

15. The computing system of claim 13 wherein allocating the new block for the compressed data portion, when the I/O request is the write request, is based upon, at least in part, determining that the field associated with the compressed data portion is invalid.

16. The computing system of claim 15 wherein the operations further comprise filling the new block with zeros.

17. The computing system of claim 16 wherein the operations further comprise marking the new block as invalid and writing new data for the write request in the new block.

* * * * *